Figure 6:
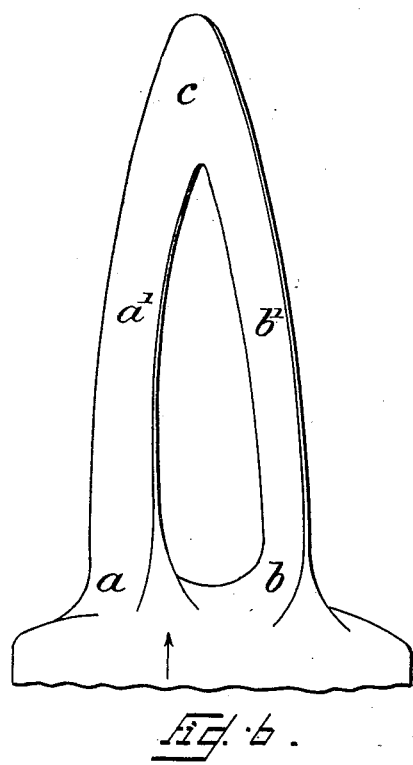
Figure 7:
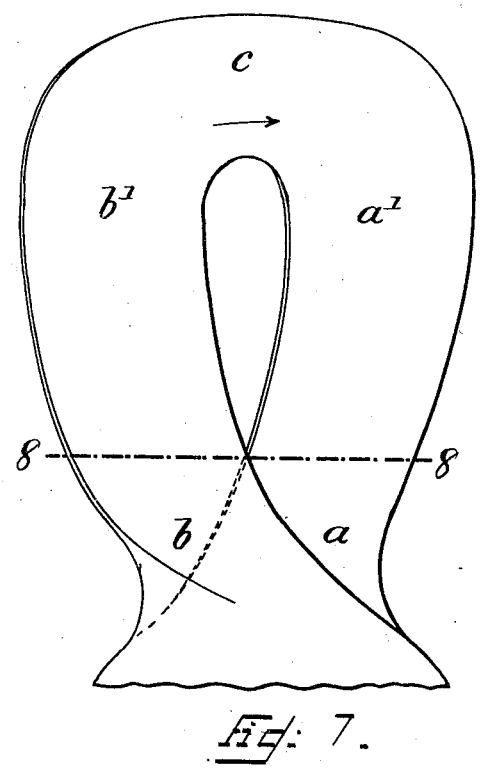
Figure 5:
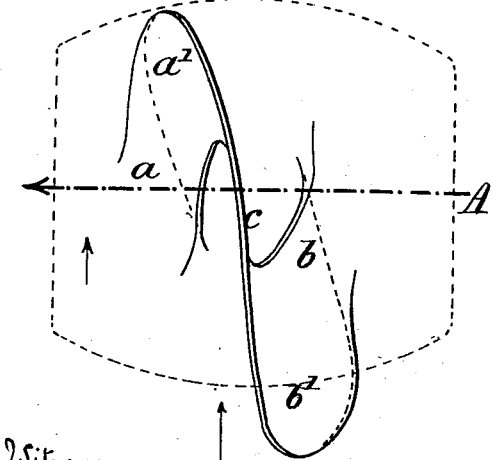

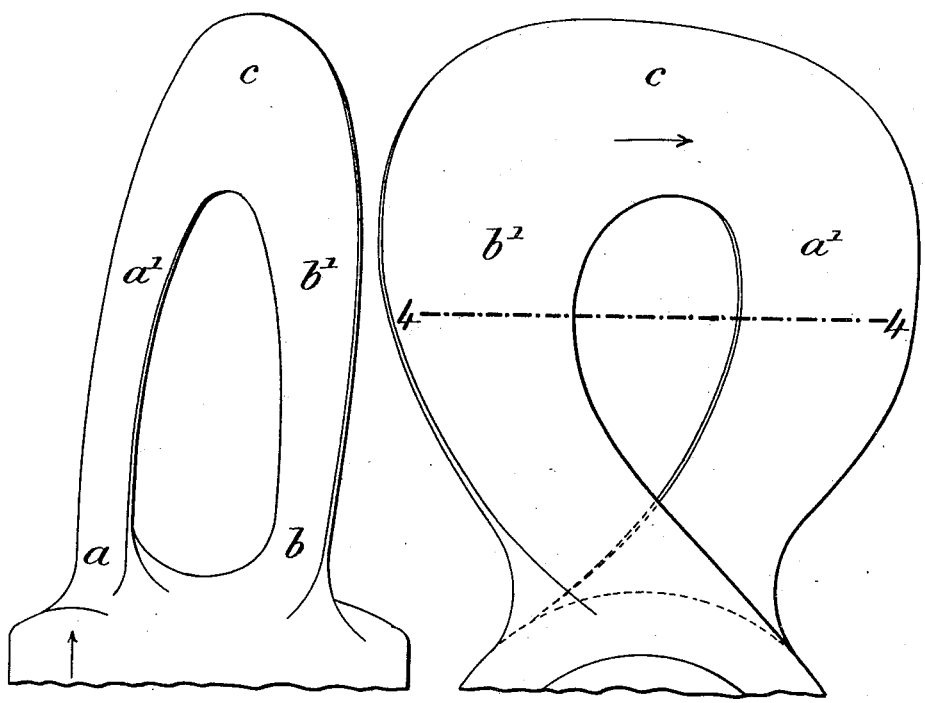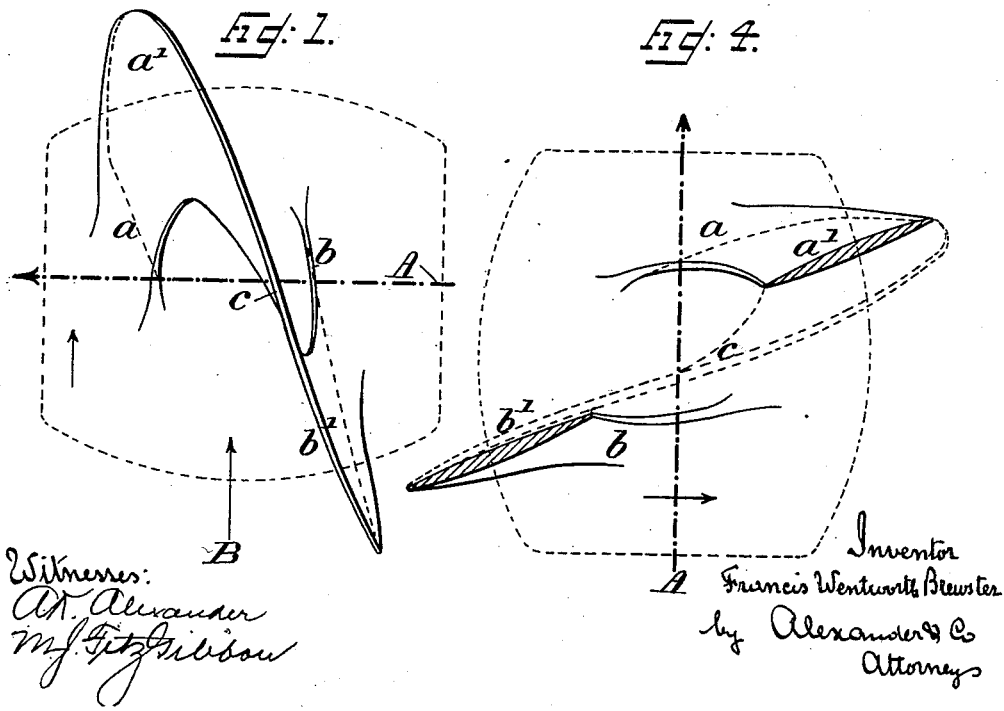

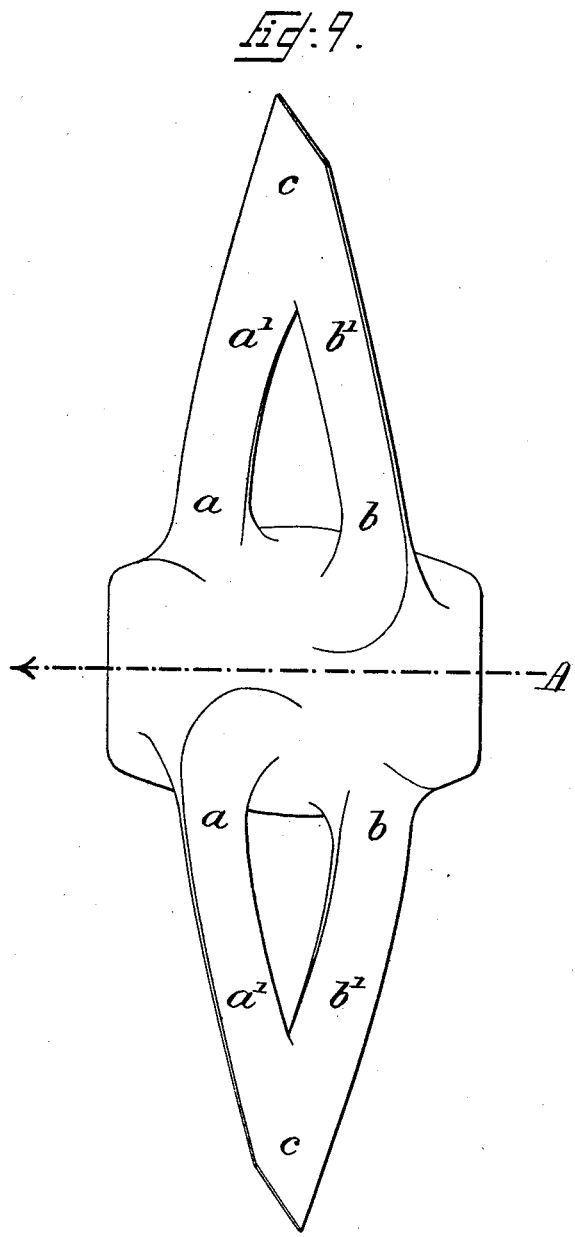

No. 680,671. Patented Aug. 13, 1901.
F. W. BREWSTER.
SCREW PROPELLER.
(Application filed May 2, 1901.)
(No Model.) 4 Sheets—Sheet 4.
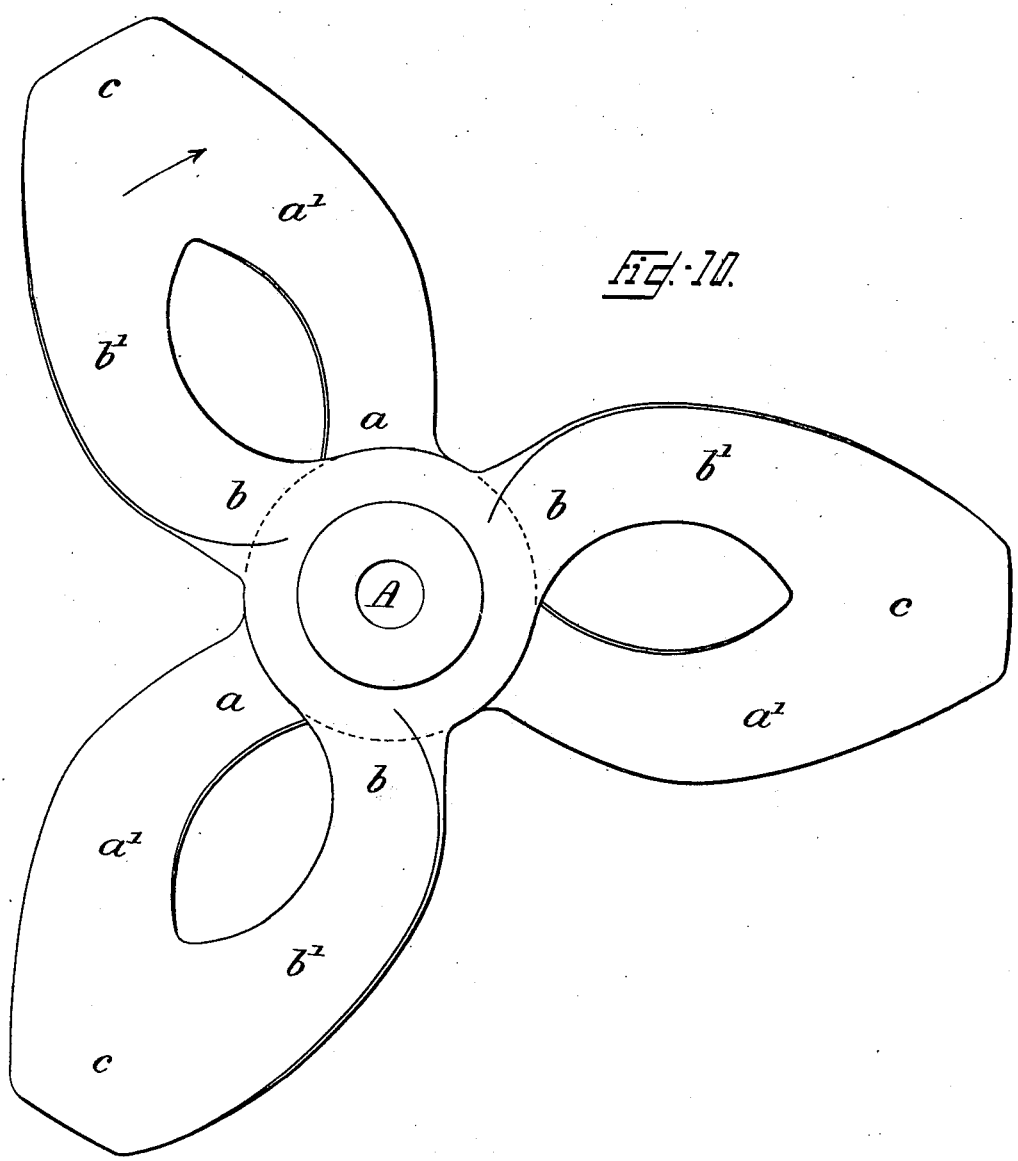

UNITED STATES PATENT OFFICE.

FRANCIS WENTWORTH BREWSTER, OF LONDON, ENGLAND, ASSIGNOR TO THE MYERS' SCREW PROPELLER SYNDICATE, LIMITED, OF MANCHESTER, ENGLAND.

SCREW-PROPELLER.

SPECIFICATION forming part of Letters Patent No. 680,671, dated August 13, 1901.

Application filed May 2, 1901. Serial No. 58,446. (No model.)

*To all whom it may concern:*

Be it known that I, FRANCIS WENTWORTH BREWSTER, a subject of the King of Great Britain and Ireland, and a resident of London, England, have invented certain new and useful Improvements in Screw-Propellers, (for which I have filed an application for British patent, No. 17,625, dated October 4, 1900;) and I do hereby declare the following to be a full, clear, and exact description of the same.

This invention relates to screw-propellers for ships or vessels, and has special reference to that class of such propellers which has blades in the form of severed loops attached at each root end to the propeller-boss or to a base adapted to be attached to such boss, the object of the invention being to improve the efficiency of action of such propellers. In such screw-propellers as hitherto made the root ends of each loop-formed blade have been so placed and arranged relatively to each other that the root end of the leading limb of the loop has been set directly in front of (speaking relatively to the direction of rotation of the propeller) and caused to rotate and pass through the water in the same plane as that of the root end of the following limb of the loop, so that the water caused to pass between the loop-limbs by the revolution of the propeller passes between the fore side of the leading limb and the aft side of the following limb. This formation and arrangement of the severed loop-formed blade is disadvantageous and reduces the effective propelling area of the latter, as the loop-limbs tend to carry around the water passing between them, and consequently to lessen its resistance, in consequence whereof the full efficiency of action and the full advantages due to screw-propellers of such formation have not hitherto been obtained. The present improvements are designed to remedy such disadvantages and to enable the full efficiency of action due to each limb of the severed loop-formed propeller-blade to be obtained; and to this end the invention is characterized by so forming the respective limbs of the severed loop-formed blade that the root ends of such limbs are arranged in helical continuity, that of the leading limb of the loop being set and connected to the propeller-boss in advance (speaking relatively to the longitudinal direction of the propeller-shaft and direction of movement of the vessel) of that of the following limb of the loop, so that such loop root ends will rotate and pass through the water in parallel planes and no part of the following loop-limb will be masked or blanketed by any part of the leading loop-limb and so that there will be a clear and unobstructed waterway between such respective limbs in the plane of rotation of the propeller and through which the water caused to pass between the loop-limbs by the revolution of the propeller will pass between the aft side of the leading limb and the fore side of the following limb, whereby the whole propelling area of both limbs of the loop-formed blade will be caused to operate against the normal resistance of the water and the full efficiency of action and the full advantages due to screw-propellers of such formation will be obtained.

The invention is represented on the accompanying drawings in Figures 1 to 4, 5 to 8, 9, and 10, which represent differently-shaped propellers of the class aforesaid made in accordance with the present improvements.

Figure 8:
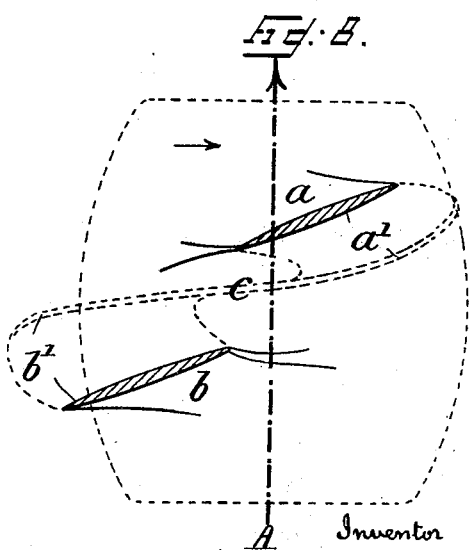

Fig. 1 represents an end on or axial view of the improved propeller-blade, the arrow-headed line A representing the axis of the propeller-shaft and the direction of movement of the vessel forward. Fig. 2 represents a side elevation of Fig. 1 looking in the direction of the plane of rotation indicated by the arrow B. Fig. 3 represents a rear elevation of Fig. 2 looking forward in the longitudinal direction of the propeller-shaft. Fig. 4 represents a plan of Fig. 3 in section on the line 4 4. Figs. 5, 6, 7, and 8 represent corresponding views to Figs. 1, 2, 3, and 4, respectively, but of a propeller of a different shape, Fig. 8 showing a section on the line 8 8, Fig. 7. Fig. 9 represents a view in the plane of rotation, and Fig. 10 represents a view in the direction of the propeller-shaft, of a propeller of another shape.

*a* represents the root end portion of the leading limb, *a'* of the severed loop-formed propeller-blade, and *b* represents the root end portion of the following limb *b'* of the blade, *c* being the circumferential part of the blade.

It will be seen on reference to the drawings, particularly to Figs. 1, 2, 4 to 6, 8, and 9, that the blade-loop root end portions $a\ b$ are set in helical continuity, that of the leading limb $a'$ being set and connected to the propeller-boss in advance (speaking relatively to the longitudinal direction of the propeller-shaft A) of that of the following limb $b'$ in such manner that such loop end parts $a\ b$ will rotate and pass through the water in different planes, that of the former in advance of that of the latter, so that no part of the following limb $b'$ will be masked or blanketed in the plane of rotation by any part of the leading limb $a'$ and so that there will be a clear and unobstructed waterway between such respective limbs in the plane of rotation of the propeller, whereby the whole propelling area of the severed loop-formed blade will be caused to operate against the resistance of the water and the full efficiency of action of the propeller will be obtained.

The improved severed loop-formed blade may be set with its radial axis in perpendicular or rectangular relation to the axis of the propeller-shaft, as represented, or it may rake forward or aft to any required extent.

What I claim as my invention, and desire to secure by Letters Patent, is—

In screw-propellers for navigable vessels, a propeller-blade made in the form of a severed loop having its leading and following loop-limbs set and attached to the propeller-boss in helical continuity, the leading limb being set and connected to the boss in advance, relatively to the line of the propeller-shaft, of the following limb so that such loop-limbs will rotate and pass through the water in parallel planes without the one blanketing the other, as set forth.

In testimony whereof I have signed this specification in the presence of two subscribing witnesses.

FRANCIS WENTWORTH BREWSTER.

Witnesses:
 HAROLD WHITCHURCH MOORING ALDRIDGE,
 JOHN ROBERT MUMFORD.